United States Patent Office 3,719,644
Patented Mar. 6, 1973

3,719,644
METHOD FOR IMPROVING CRYSTALLINITY OF VINYLIDENE FLUORIDE POLYMERS
Masahiro Segawa and Yukichika Kawakami, Iwaki, Japan, assignors to Kureha Kagaku Kogyo Kabushiki Kaisha, Tokyo-to, Japan
No Drawing. Filed June 15, 1971, Ser. No. 153,271
Claims priority, application Japan, June 20, 1970, 45/53,941
Int. Cl. C08f 3/22, 15/08
U.S. Cl. 260—87.7        11 Claims

ABSTRACT OF THE DISCLOSURE

Polyvinylidene fluoride having improved crystallinity can be obtained by treating it with a solution of an inorganic electrolyte dissolved in water-soluble organic solvent or in a mixture of water and such organic solvent.

---

This invention relates to vinylidene fluoride polymers having improved crystallinity, and, more particularly, it relates to a method for improving crystallinity of vinylidene fluoride polymers by treating them with a hydrophilic organic solvent or a mixture of such solvent and water (hereinafter referred to as "hydrophilic organic solution"), in which an inorganic electrolyte is dissolved.

Polyvinylidene fluoride is superior to any other classes of fluorine-containing polymer in its machinability, anti-aging property, ultraviolet-resistance, radioactive-resistances, mechanical strength, wear-resistance, oil-resistance, chemical-resistance, anti-contamination, and various other physical and chemical properties and, hence much attention has been paid to this polymer in recent days as a useful industrial material for various purposes.

On the other hand, however, the polymer possesses strong crystallinity, and when it is cooled from its molten state to a solidified state, large spherulites tend to occur with the consequent disadvantageous effects on its properties. For example, shaped articles of polyvinylidene fluoride such as sheets, plates, tubes, etc. manufactured by ordinary machining (or processing) conditions assume white turbidity, or, when the polymer is used for coating, if it is subjected to an extremely slow cooling with a view to restricting residual stress, fine cracks are caused on the coated surface.

Although no large spherulites are produced from rapid cooling, most of the shaped articles of polyvinylidene fluoride cannot be subjected to the rapid cooling from the standpoint of this configuration, and, moreover, such rapid cooling is only effective in depth of from 0.1 to 0.3 mm. from the surface part of the shaped articles, since plastic materials are generally poor in their heat-conductivity. Accordingly, when a shaped product of large thickness is subjected to rapid cooling or quenching, the interior thereof inevitably to develop large spherulites, and residual stress tends to exist.

It is therefore an object of the present invention to provide polyvinylidene fluoride having good machinability or processability and in which no large spherulites occur irrespective of the manner of machining or processing.

It is another object of the present invention to provide polyvinylidene fluoride shaped article having good transparency and no residual stress therein.

It is another object of the present invention to provide a method for improving crystallinity of polyvinylidene fluoride so as to cause it to be constituted of fine spherulites alone.

According to the present invention, there is provided a method for improving crystallinity of polyvinylidene fluoride which comprises treating polyvinylidene fluoride powder with a hydrophilic organic solvent or a mixture of the solvent and water, in which an inorganic electrolyte is dissolved.

The nature, principle, and details of the present invention will become more apparent from the following description and preferred examples.

As the results of various studies and experiments carried out by the present inventors concerning improvements in crystallinity of polyvinylidene fluoride, it has been discovered that the polymer treated with hydrophilic organic solution of at least one inorganic electrolytic substance sufficiently attains the above-mentioned objective.

The polyvinylidene fluoride referred to herein not only designates homopolymers of vinylidene fluoride, but also includes copolymers of vinylidene fluoride containing therein more than 90 mol percent vinylidene fluoride and which substantially exhibit the same properties as the homopolymers. For the monomer which is copolymerizable with vinylidene fluoride, there are tetrafluoroethylene, hexafluoropropylene, chloro-trifluoro ethylene, vinyl fluoride, etc.

The water-soluble inorganic electrolyte is a substance that disperses in the polyvinylidene fluoride particles to constitute crystal nuclei, which finally become crystals of inorganic salt. However, it is not always necessary that a solution of such inorganic electrolyte for example sodium chloride, is used from the beginning of the treatment of the vinylidene fluoride polymer, but such polymer particles may be first treated with e.g. dispersed in, caustic soda solution, such as sodium or potassium hydroxide, then washed with diluted hydrochloric acid solution, and dried, whereby inorganic salt crystals of sodium chloride produced by the acid addition are dispersed in the vinylidene fluoride particles. Potassium chloride, sodium chloride, and rubidium chloride are particularly favorable as the inorganic salt for the purpose of the present invention.

The pH value of the treatment solution may be weakly alkaline. However, when the finally obtained polyvinylidene fluoride is of alkaline property, the thermal stability of the resin is lowered at the time of shaping or other like processing. Consequently, if the polymer is treated with an alkali solution, it is preferable that the polymer be rendered neutral or weakly acidic by further treating the same with a hydrophilic acidic solution prior to drying.

In treating the polyvinylidene fluoride with an inorganic electrolyte, it is hardly possible to attain any appreciable effect by merely adding fine solid particles of the electrolyte to the polyvinylidene fluoride powder. The result is the same when the polymer is treated with water alone. Addition of the inorganic electrolyte to polyvinylidene fluoride must be done in the presence of a hydrophilic organic solution. The hydrophilic organic solution referred to herein designates a water-soluble organic polar solvent or a solution prepared from a mixture of water and at least one of the above-mentioned organic polar solvents. In the case of the latter, there is no specific limitation in the mixing ratio between the inorganic electrolyte and the mixed solvent, provided that the inorganic electrolyte is prefectly dissolved in the mixed solvent. The usual range of the mixing ratio, however, is from 0 to 90 parts by weight of water with respect to from 100 to 10 parts by weight of the organic polar solvent. Examples of the water-soluble organic polar solvent are: methyl alcohol (methanol), ethyl alcohol (ethanol), acetone, dioxane, dimethyl formamide, acetic acid, and others.

The reason for using such water-soluble organic polar solvent in the treatment according to the present invention is that the polar solvent possesses extremely high wettability to the polyvinylidene fluoride having large polarity. While this might be related with the low surface tension of such polar solvent, no perfect wetting can be attained with a non-polar organic solvent such as, for example, n-heptane which has a lower surface tension than methyl alcohol, ethyl alcohol, etc. As proof of this, the specific gravity of porous particles of polyvinylidene fluoride resulted from suspension polymerization as measured in n-heptane is found to be smaller than that measured in the polar organic solvent such as methyl alcohol. It is evident from this that n-heptane has difficulty penetrating into the voids of polyvinylidene fluoride particles, and hence low wettability.

Polyvinylidene fluoride to be treated may be produced by any polymerization method such as emulsion polymerization, suspension polymerization, and others. Porous particles of the polymer bring better result after the treatment. For example, the polyvinylidene fluoride obtained by suspension-polymerizing vinylidene fluoride monomer in water in the presence of high molecular suspending agents such as, for example, methyl-cellulose, polyvinyl alcohol, etc. at a temperature of 30° C. or below is highly porous. Such porous polymer is found to be most suitable for the treatment according to the present invention.

In obtaining the polyvinylidene fluoride of improved crystallinity according to the present invention, the polymer particles are immersed into a solution of alkali metal halide, for example, dissolved in a mixed solvent of methanol and water, and then they are taken out of the solution and dried. The treatment should preferably be conducted in such a manner that, at the completion of the drying, the solid content of the inorganic electrolyte in 100 parts by weight of the polyvinylidene fluoride particles is in the range of from 0.02 to 3 parts by weight, or, more preferably, from 0.05 to 3 parts by weight. An alkali metal halide content of below 0.02 part by weight results in a poor crystal nucleating effect. On the other hand, more than 3 parts by weight of the inorganic electrolyte may sufficiently attain the microcrystallization of the polyvinylidene fluoride, hence this upper limitation, for the content is not so critical, and well within the scope of the present invention. In case more than 3 parts of the inorganic electrolyte is to exist in the treated polymer particles, the excessive portion serves as a filler.

In the treatment of polyvinylidene fluoride for its microcrystallization by using hydrophilic organic solution of the inorganic electrolyte, the length of time for immersion into the solution of polyvinylidene fluoride may be 30 minutes or so. The drying operation of the polymer after it is taken out of the solution is 24 hours at 80° C., since the drying is used simply to evaporate the mixed solvent out of the polymer.

The polyvinylidene fluoride particles thus treated possess various advantageous features such that the particles can be easily pelletized, or the pellets thus formed can be molded into various desired configurations, or the particles may be used as they are for powder-coating and other melt processing under heat as is the case with ordinary polyvinylidene fluoride. Moreover, the polymer, to whatever degree of slow cooling it may be subjected at the time of the melt processing, creates only very fine spherulites with the consequence that the coated layer assumes enamel gloss, and the shaped articles thereof are transparent and possess impact strength of more than 50% greater than the shaped articles of untreated ordinary polyvinylidene fluoride.

In order to enable skilled persons in the art to reduce the present invention into practice, the following examples are presented. It should, however, be noted that these examples are illustrative only, and are not intended to reduce the scope of the present invention as set forth in the appended claims.

EXAMPLE 1

1 g. of various kinds of inorganic electrolyte as listed hereinbelow was perfectly dissolved in an aqueous solution of 100 g. of water and 300 g. of methyl alcohol, thereby preparing various hydrophilic organic solutions of inorganic electrolytes.

Into each of these solutions, 100 g. of polyvinylidene fluoride (PVDF) particles obtained from the suspension polymerization at 25° C., and having a particle size range of from 100 to 350 meshes and an inherent viscosity $\eta_{inh}$ of 1.00 was added and kept contacted therein for 30 minutes at a normal temperature, while sufficiently agitating the same, thereafter it was separated from the solution by filtration, and desiccated.

The solid content of the inorganic electrolyte in the polyvinylidene fluoride after the drying was 0.3 part by weight with respect to 100 parts by weight of the polymer.

The thus treated polymer powders were then press-formed at a temperature of 240° C. into sheets of 0.5 mm. thick. A sheet of the same thickness was also formed with polyvinylidene fluoride containing no inorganic electrolyte.

Each of the press-formed sheets thus obtained was measured for its transparency in terms of its light-transmission factor in a visible light of 600 m$\mu$. The measured results are shown in the following Table I.

TABLE I

| Inorganic electrolyte | Solid content of inorganic electrolyte in 100 parts by wt. of PVDF (wt. part) | Light transmission factor in visible light of 600 m$\mu$, percent* |
| --- | --- | --- |
|  | 0 | 20 |
| Potassium chloride (KCl) | 0.3 | 78 |
| Sodium chloride (NaCl) | 0.3 | 68 |
| Calcium chloride (CaCl$_2$) | 0.3 | 57 |
| Zinc chloride (ZnCl$_2$) | 0.3 | 27 |
| Potassium iodide (KI) | 0.3 | 58 |
| Potassium bromide (KBr) | 0.3 | 49 |
| Copper chloride (CuCl$_2$) | 0.3 | 29 |
| Magnesium chloride (MgCl$_2$) | 0.3 | 34 |
| Potassium nitrate (KNO$_3$) | 0.3 | 26 |
| Rubidium chloride (RuCl) | 0.3 | 70 |

*Measured by "Hitachi White-Color Spectrophotometer ESP-2" manufactured by Hitachi, Ltd., Japan.

Further, sample pieces were taken from these press-formed sheets, and observed through a polarization microscope. It was found that most of the spherulites in the polyvinylidene fluoride sheet containing no inorganic electrolyte were more than 10 microns in diameter, while those polyvinylidene fluoride sheets containing such inorganic salts showed very fine spherulites of less than 1 micron in its substantially entire portion. Particularly, those sheets having a light transmission factor of 50% and above were found to have uniformly dispersed extremely fine spherulites of less than 0.5 micron.

EXAMPLE 2

Aqueous solutions of varying contents of potassium chloride (KCl) as the inorganic electrolyte were prepared, and polyvinylidene fluoride particles were contacted in each of these solutions.

The following Table II shows, in comparison, the transparency of polyvinylidene fluoride sheets of 0.5 mm. thick formed in the same manner as in Example 1 in terms of the light transmission factor thereof in a visible light of 600 m$\mu$.

TABLE II

| Quantity of KCl used (wt. part) | Content of KCl in 100 wt. parts of PVDF (wt. part) | Light transmission factor in visible light of 600 m$\mu$, percent |
| --- | --- | --- |
| 0 | 0 | 20 |
| 0.04 | 0.01 | 22 |
| 0.2 | 0.05 | 24 |
| 0.4 | 0.10 | 55 |
| 0.8 | 0.20 | 70 |
| 1.6 | 0.40 | 80 |
| 4.0 | 1.00 | 80 |
| 8.0 | 2.00 | 78 |

NOTE.—(1) Composition of aqueous solution, water/methyl alcohol= 100/300. (2) Treatment time, 30 minutes. (3) Treatment temp., normal temp.

EXAMPLE 3

An aqueous solution of potassium chloride (100 wt. parts of water, 300 wt. parts of acetone, and 1 wt. part of KCl) was prepared, in which polyvinylidene fluoride particles obtained from suspension-polymerization were treated. The content of potassium chloride in 100 parts by weight of the treated PVDF was 0.3 part by weight.

In accordance with ASTM Designation D256–56, test pieces of ¼ inch thick with notch were made from both PVDF powder containing KCl and PVDF powder containing no KCl. These test pieces were subjected to measurement for Izod impact strength. The test piece of ordinary PVDF showed the strength of 10.1 kg.-cm./cm., of notch, while the test piece of improved PVDF according to the present invention showed the strength of 16.7 kg.-cm./cm. of notch.

EXAMPLE 4

Into the same aqueous solution of potassium chloride as in Example 3, polyvinylidene fluoride powder produced by the suspension polymerization at 25° C. and having the inherent viscosity $\eta_{inh}$ of 1.00 was immersed and sufficiently contacted. The content of potassium chloride in 100 parts by weight of vinylidene fluoride thus treated was 0.3 part by weight.

This particulate composition was placed on a soft steel block, heated to 240° C. to melt, left for 1 hour under the heat, and then gradually cooled in air or normal temperature to solidify, whereby a PVDF film of 1 mm. thick was formed.

The same operations were conducted with PVDF containing no potassium chloride, and a film of the same thickness was prepared. A small specimen was taken from the center portion of each of the films, and observed through a polarization microscope. It was disclosed that PVDF film containing no KCl created spherulites of 30–50 microns, while the improved PVDF film according to the present invention consisted of uniform spherulites of less than 0.5 micron.

EXAMPLE 5

Sodium iodide (NaI) was dissolved into methyl alcohol to prepare methyl alcohol solution of sodium iodide.

Polyvinylidene fluoride powder obtained by the suspension polymerization was treated in this solution, and the treated polyvinylidene fluoride powder was press-formed into a sheet of a thickness of 0.5 mm. at 240° C.

On the other hand, another sheet of the thickness was press-formed from untreated polyvinylidene fluoride at the same conditions as above.

The following Table III indicates the comparative results of transparency of the two polymer sheets in terms of the light transmission factors in a visible light of 600 m$\mu$.

TABLE III

| Inorganic electrolyte | Content of inorganic electrolyte in 100 wt. parts of PVDF (wt. part) | Light transmission factor in visible light of 600 m$\mu$, percent |
|---|---|---|
| Sodium iodide (NaI) | 0 | 20 |
|  | 0.3 | 60 |

NOTE.—Treatment was done for 30 minutes at a normal temperature in a 1% methyl alcohol solution of NaI.

EXAMPLE 6

A water/ethyl alcohol solution of potassium hydroxide or caustic potash (KOH) was prepared by first dissolving 1 g. of KOH into 100 g. of water, which was then mixed with 300 g. of ethyl alcohol.

To this solution, 100 g. of polyvinylidene fluoride powder obtained by the suspension polymerization was added, and sufficiently agitated for 10 minutes at normal temperature, after which 10% conc. hydrochloric acid was added dropwise until the pH value of the solution became 6. Agitation was continued for 20 minutes thereafter, and then the treated polyvinylidene fluoride was separated from the solution by filtration. The content of potassium chloride in 100 parts by weight of polyvinylidene fluoride was 0.3 part by weight.

The thus treated polyvinylidene fluoride powder was press-formed into a sheet of 0.5 mm. thick by the same operating conditions as in Example 1, and the press-formed sheet was measured for its light transmission factor in a visible light of 600 m$\mu$. It was 75%.

EXAMPLE 7 (REFERENCE)

Polyvinylidene fluoride powder obtained by the suspension polymerization under the same conditions as in Example 1 was contacted with sodium chloride in three different ways as shown in the following table, i.e., with water/methyl alcohol solution of sodium chloride, with crystalline NaCl, and with a simple aqueous solution of NaCl without using the polar organic solvent.

From each of these differently treated polyvinylidene fluoride powders, a sheet of 0.5 mm. thick was press-formed, and was measured for its light transmission factor in a visible light of 600 m$\mu$. The results are as follows.

TABLE IV

| Content of NaCl in 100 wt. parts of PVDF (wt. part) | Method of treatment | Light transmission factor in visible light of 600 m$\mu$, percent |
|---|---|---|
| 0 | | 20 |
| 0.3 | In water/methyl alcohol solution of NaCl. | 68 |
| 0.3 | Direct addition of crystalline NaCl | 18 |
| 0.3 | In simple aqueous NaCl solution without methyl alcohol. | 20 |

EXAMPLE 8 (REFERENCE)

Polyvinylidene fluoride powder obtained by the suspension polymerization was measured for its specific gravity in n-heptane and ethyl alcohol, respectively, as a medium by using a Gay-Lussac type pycnometer. The results are shown below.

TABLE V

| Medium | Surface tension of medium (dyn/cm. of 20° C.) | Specific gravity of PVDF powder | Specific gravity of PVDF pellets |
|---|---|---|---|
| n-Heptane | 13.05 | 1.6585 | 1.7740 |
| Ethyl alcohol | 22.55 | 1.7910 | 1.7800 |

NOTE.—Measured at 30° C.

As will be seen from the above Table V, n-heptane, though its surface tension is low, cannot penetrate into fine voids of the porous particles of polyvinylidene fluoride. In contrast, ethyl alcohol does penetrate into these fine voids, and results in a large value of specific gravity. The measured specific gravity of the PVDF powder in ethyl alcohol is fairly close to that of the PVDF pellets.

We claim:

1. A method for improving the crystallinity of vinylidene fluoride polymers selected from the group consisting of homopolymers of vinylidene fluoride and copolymers of vinylidene fluoride containing more than 90 mol percent of vinylidene fluoride and exhibiting substantially the same properties as the homopolymers, which comprises (1) contacting porous particles of the vinylidene fluoride polymer, obtained by suspension-polymerization, with a solution of an inorganic electrolyte selected from the group consisting of alkali metal halides, calcium chloride, zinc chloride, copper chloride, magnesium chloride and potassium nitrate dissolved in a hydrophilic organic solution containing from 10 to 100 parts by weight of a water-soluble organic polar solvent and 0 to 90 parts by weight of water for a sufficient length of time to cause the inorganic electrolyte to uniformly disperse and penetrate into the voids of the polymer particles, (2) separating the thus treated vinylidene fluoride polymer from the hydrophilic organic solution and (3) drying the resultant polymer at a temperature and for a length of time sufficient to expel the hydrophilic organic solution, the solid content of the inorganic electrolyte in 100 parts by weight of the polyvinylidene fluoride particles in the dried product being from 0.02 to 3 parts by weight.

2. The method according to claim 1, further comprising adding a hydrophilic acidic solution to said solution of inorganic electrolyte, to bring the pH value of said solution within a range of from weak acidity to neutrality.

3. The method according to claim 1, in which said water soluble organic polar solvent is at least one member selected from the group consisting of methyl alcohol, ethyl alcohol, acetone, dioxane, dimethyl formamide, acetic acid, and a mixture of water and any of these solvents.

4. The method according to claim 1, wherein said copolymer is a copolymer of vinylidene fluoride and a compound selected from the group consisting of tetrafluoroethylene, hexafluoropropylene, chlorotrifluoroethylene and vinyl fluoride.

5. The method according to claim 1, in which said hydrophilic organic solution is a mixture of 300 parts by weight of methyl alcohol and 100 parts by weight of water with respect to 100 parts by weight of the vinylidene fluoride polymer.

6. The method according to claim 1, in which the solid content of said inorganic electrolyte dispersed in the dried vinylidene fluoride polymer is 0.05 to 3 parts by weight with respect to 100 parts by weight of the polymer.

7. A method for improving the crystallinity of vinylidene fluoride polymers selected from the group consisting of homopolymers of vinylidene fluoride and copolymers of vinylidene fluoride containing more than 90 mol percent of vinylidene fluoride and exhibiting substantially the same properties as the homopolymers, which comprises (1) dispersing porous particles of the vinylidene fluoride polymer, obtained by suspension-polymerization, into a solution of sodium hydroxide or potassium hydroxide dissolved in a hydrophilic organic solution containing from 10 to 100 parts by weight of a water-soluble organic polar solvent and 0 to 90 parts by weight of water, (2) adding dilute hydrochloride acid dropwise to the resultant dispersion to bring the pH of the dispersion liquid within the range of weak acidity to neutrality, (3) separating the thus treated vinylidene fluoride polymer from the hydrophilic organic solution and (4) drying the polymer particles at a temperature and for a length of time sufficient to expel the hydrophilic organic solution, the solid content of the inorganic salt formed and dispersed into the voids of the polymer particles during step (2) being from 0.02 to 3 parts by weight based on 100 parts by weight of the polyvinylidene fluoride particles.

8. The method according to claim 7, in which said hydrophilic organic solution is a mixture of 300 parts by weight of ethyl alcohol and 100 parts by weight of water with respect to 100 parts by weight of the vinylidene fluoride polymer.

9. The method according to claim 7, in which said pH is in the range of from 6 to neutrality.

10. The method according to claim 7, in which the solid content of the inorganic salt dispersed in the dried polymer particles is 0.05 to 3 parts by weight with respect to 100 parts by weight of the polymer.

11. The method according to claim 7, in which said water-soluble organic polar solvent is at least one member selected from the group consisting of methyl alcohol, ethyl alcohol, acetone, dioxane, dimethyl formamide, acetic acid, and a mixture of water and any of these solvents.

References Cited
UNITED STATES PATENTS 3,031,437  4/1962  Iserson _____ 260—92.1 R
3,419,900  12/1968  Elmore et al. _____ 260—92.1 R HARRY WONG, JR., Primary Examiner U.S. Cl. X.R.

117—161; 260—41 B, 92.1